United States Patent
Sayers et al.

(10) Patent No.: US 7,519,822 B2
(45) Date of Patent: Apr. 14, 2009

(54) METHOD AND APPARATUS FOR PROCESSING DESCRIPTIVE STATEMENTS

(75) Inventors: Craig P. Sayers, Menlo Park, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 10/798,187

(22) Filed: Mar. 10, 2004

(65) Prior Publication Data

US 2005/0204141 A1 Sep. 15, 2005

(51) Int. Cl.
- *H04L 9/00* (2006.01)
- *G06F 15/173* (2006.01)
- *H04L 9/32* (2006.01)
- *G09C 1/00* (2006.01)

(52) U.S. Cl. .................. 713/176; 713/181; 709/223
(58) Field of Classification Search .............. 713/176; 709/223

See application file for complete search history.

(56) References Cited

U.S. PATENT DOCUMENTS

2004/0244012 A1* 12/2004 Massarenti ............... 719/319
2006/0265489 A1* 11/2006 Moore ....................... 709/223

FOREIGN PATENT DOCUMENTS

EP 654920 A2 * 5/1995

OTHER PUBLICATIONS

Florin Rusu, Alin Dobra, "Fast Range-Summable Random Variables for Efficient Aggregate Estimation", Jun. 2006, SIGMOD '06: Proceedings of the 2006 ACM SIGMOD International Conference on Management of Data, pp. 193-204.*

M. Atreya. Digital Signatures and Digital Envelopes, RSA Security white paper. http://www.rsasecurity.com/products/bsafe/whitepapers/ Article5-SignEvn.pdf, Nov. 2003.

M. Bellare and D. Micciancio. A New Paradigm for Collision-Free Hashing: Incrementally at Reduced Cost. Advances in Cryptography—EuroCrypto 97, Lecture Notes in Computer Science, vol. 1233, pp. 163-192. Springer Verlag, New York, 1997.

(Continued)

*Primary Examiner*—Matthew B Smithers
*Assistant Examiner*—Courtney D Fields

(57) ABSTRACT

This disclosure provides a method and apparatus for processing descriptive statements. More particularly, this disclosure provides a way of quickly and reliably signing and authenticating RDF statements without requiring a data sort. By using a commutative hashing function that combines multiple independent hashes, ideally one per serialized statement, signing and verifying can each be completed without a data sort; inclusion of an "extra" identifier, e.g., the total number of RDF statements, may enhance the security of the signed statements by helping minimize exposure to potential attackers. The disclosure also describes how to later add additional statements to an existing signature and hash using an incremental process. Effective blank node handling may also achieved using this incremental process by requiring intermediate machines to add a new "reverse-labeling" statement each time a blank node is locally assigned; the new statement, essentially provides information to permit downstream to reverse the labeling process and thereby reliably verify authentic the original RDF statements.

31 Claims, 6 Drawing Sheets

OTHER PUBLICATIONS

D. Clarke, S. Devadas, B. Gassend, M. Van Dijk, and E Suh. Incremental Multiset Hash Functions and Their Application to Memory Integrity Checking. Asiacrypt 2003 Conference, pp. 188-207 Nov. 2003.

Federal Information Processing Standard Publication 180-1, US Department of Commerce/N.I.S.T., National Technical Information Service, Springfield, VA FIPS 180-1: Secure harh standard, Apr. 1995.

J. Grant and D. Beckett. RDF Test Cases, W3C working draft. http://w3.org/TR/2002/WD-rdf-testcaes-20020429, Apr. 29, 2002.

G. Klyne and J. Carroll. Resource Description Framework (RDF): Concept and Abstract Syntax. http://w3.org/TR/rdf-concepts, Nov. 8, 2002.

O. Lassila and R. Swick. Resource Description Framework (RDF) Model and Syntax Specification, W3C recommendation. http://w3.org/TR/1999/RED-rdf-syntax-19990222, Feb. 22, 1999.

S. Melnik. RDF API Draft http://www-db.standford.edu/melnik/rdf/api.html#digest, Jan. 19, 2001.

Patrick Hayes. RDf Semantics. http://www.w3.org/TR/2003/WD-rdf-mt-20030905, Sep. 5, 2003.

R. Rivest. Request for Comments (RDF) 1321: The MD5 Message Digest Algorithm. http://www/ietf.org/rfc/rfc1321.text, Apr. 1992.

D. Wagner. A Generalized Birthday Problem, Crypto Aug. 18-22, 2002, Lecture Notes in Computer Science, vol. 2442, pp. 288-303, Springer-Velag, Berlin Heidelberg, 2002.

A.L. Zobrist. A Hashing Method With Applications For Game Playing. Technical Report 88, Computer Science Dep't. University of Wisconsin Madison, 1970. Reprint in International Computer Chess Association Journal vol. 13, No. 2 pp. 69-73, 1990.

David Beckett. The Design and Implementation of the Redland RDF Applicaiton Framwork. Proceedings of the Tenth International Conference on World Wide Web, Hong Kong, Hong Kong. pp. 449-456 in 2001. ISBN: 1-58113-348-0.

D. Banks, S. Cayzer, L Dickinson, and D. Reynolds. The ePerson Snippet Manager: a Semantic Web application. Technical Report HPL-2002-328, Hewlett Packard Company, Dec. 22, 2002.

M. Bellare, O. Goldreich, and S. Goldwaser. Incremental Cryptography: The Case of Hashing and Signing. Advances in Cryptography-Crypto'94. Proceedings, Lecture Notes in Computer Science, vol. 839, Springer Verlag, New York 1994.

J. Carroll. Signing RDF Graphs. Technical Report HPL-2003-142, Hewlett Packard Company, Sep. 7, 2003.

R. L. Rivest, A Shamir, and L. M. Adelman. A Method for Obtaining Digital Signatures and Public-Key Cryptosystems. Communication of the ACM, vol. 21, Issue 2 (Feb. 1978, pp. 120-126 ISSN:0001-0782 New York, NY, USA.

Bellare et al. The Security of the Cipher Block Chaining Message Authentication Code. Journal of Computer and System Science, vol. 61, No. 3, Dec. 2000, pp. 362-399.

Haber et al. Secure Names for Bit-Strings. Proceedings of the 4th ACM Conference on Computer and Communications Security. Zurich, Switzerland, pp. 28-35 published in 1997 ISBN: 0-89791-912-2.

Phillip Rogaway. Authenticated-Encryption with Associated-Date. Proceedings of the 9th ACM Conference on Computer and Communication Security, Washington, DC, USA, pp. 98-107, published in 2002. ISBN: 1-58113-612-9.

Conen et al. Exchanging Semantics with RDF. Information Age Economy Fifth Internatinal Conference of Wirtschaftsinformatik Augsburg, Sep. 19-21, 2001. ISBN: 3-7908-1427-X Physica-Verlag.

Sayers et al. AP Pragmatic Approach to Storing and Distributing RDF in Context Using Snippets. Technical Reports HPL-2003-231, Hewlett Packard Company, Dec. 7, 2003.

R. L. Rivest. The RC5, Encryption Algorithm. Proceedigns of the 1994, Leuven Workshop Encryption. Springer 1995. pp. 86-96.

Ralph R. Swick. Putting it Together: RDF: Weaving the web of discovery, netWorker, vol. 3, Issue 2, pp. 21-25. Jun. 1999 ISSN:1091-3556.

Broekstra et al. Enabling Knowledge Representation on the Web by Extending RDF Schema. Proceedings of the Tenth International Conference on World Wide Web. Hong Kong, Hong Kong. pp. 467-478. Published in 2001. ISBN:1-158113-348-0.

Karvounarakis et al. RQL: A Declarative Query Language for RDF. Proceedings of the Eleventh International Conference on World Wide Web. Honolulu, Hawaii, USA. pp. 592-603. Published 2002. ISBN: 1-58113-449-5.

Patel-Schneider et al. The Yin/Yang Web: XML Syntax and RDF Semantics. Proceedings of the Eleventh International Conference on Wold Wide Web. Honolulu, Hawaii, USA. pp. 443-453. Published 2002. ISBN: 1-58113-449-5.

* cited by examiner

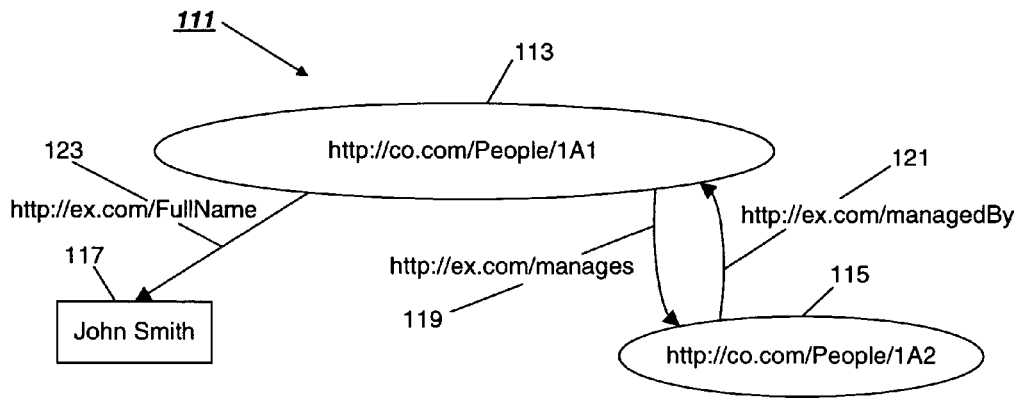
FIG. 1
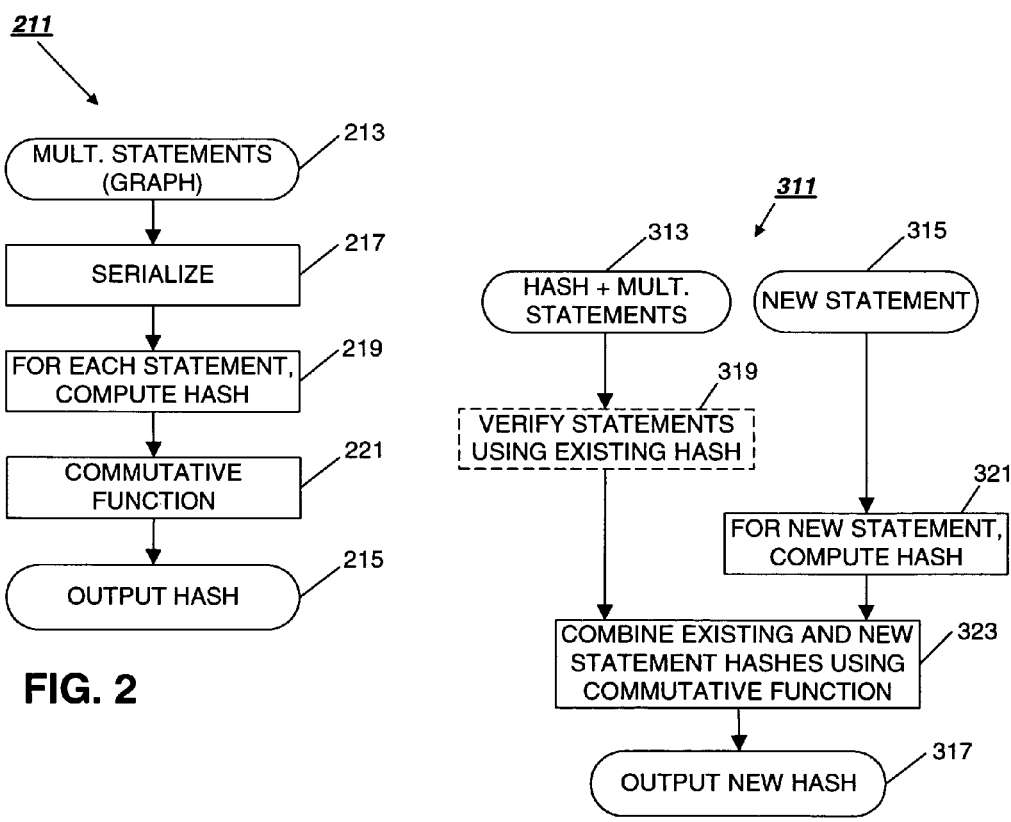
FIG. 2
FIG. 3

FIG. 9
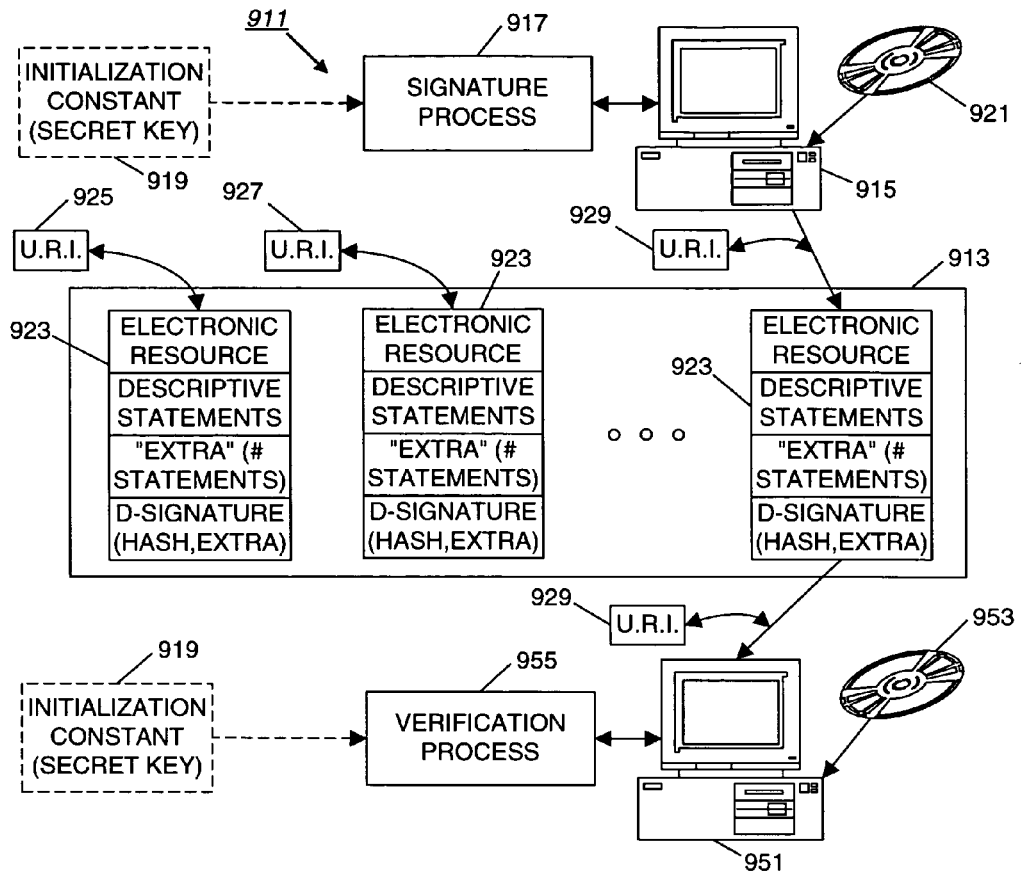
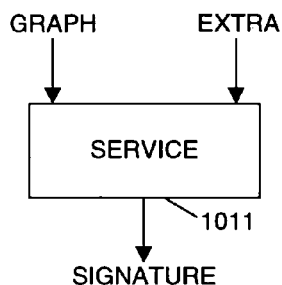
FIG. 10
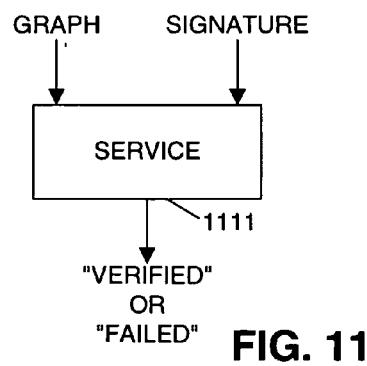
FIG. 11

METHOD AND APPARATUS FOR PROCESSING DESCRIPTIVE STATEMENTS

BACKGROUND

With the ever increasing use of electronic machines to store and access data, computers and computer software are presented with an increasingly difficult task of sifting through vast quantities of irrelevant information in answering search queries. Simply put, conventional computer technology is not very good at understanding the context of search terms, and there exists little in the way of a "library card" index to permit computers and computer software to filter out irrelevant uses of search terms; to provide one hypothetical example, a conventional computer search based on a keywords of "Mexico" and "travel" might return any electronically-accessible resource having both of these words, without ready ability to distinguish different types of documents or other resources based on context, e.g., "travel books" about the country of "Mexico" from other books such as fiction.

In part to address this difficulty, information technologists have attempted to create standards for scalable, easily defined languages that help machines process electronic data based on vocabularies that provide context; one such language is the resource description framework, or the "RDF", which provides standard way of expressing attributes of electronic information. It is hoped that through the use of descriptive languages such as provided by the RDF, information technology will find better, faster, and more accurate ways of sifting through the vast amount of information accessible to computers or computer networks (including the world-wide web).

With the generation of descriptive languages, however, there is also potential for abuse; in this regard, descriptive language systems such as the RDF provide a framework for expressing statements about an object (e.g., an electronic document, such as a web-page), and one usage of these statements is to provide context for "metadata" stored transparently as part a document. With many electronically-stored documents, there is a need to verify authenticity of statements made about those documents (and not just the documents themselves). To provide one example of such a document, one can imagine a web page that describes a piece of real property, and a statement within that web page that provides contact information for the "owner" of that piece of real property; clearly, there is the potential for abuse if one can forge the identity of the owner (without forging the visible part of the document, i.e., the description of the real property itself). The need to authenticate descriptive statements about an electronic resource such as a document generally arises when the resource and its statements are stored remotely (or transmitted through a remote source) and one wants to verify that the resource or its statements have not been tampered with.

Conventionally, metadata, RDF expressions and other descriptive statements ("descriptive statements" or "descriptive data") can be authenticated using a digital signature scheme. There are many information processing techniques for such signature processes and, generally, they operate by arranging a collection of statements in a data string of a specific format, breaking that string up into blocks of data (e.g., 512 bit blocks) and then processing those blocks to concatenate a relatively short (e.g., 160 bit) value as a hash that is difficult to exactly duplicate with even a slightly modified message; this hash is then encrypted using a secret "private key," which can feasibly be decrypted only using an associated, published counterpart key called a "public key."

While generally successful for their intended purposes, most conventional signature schemes have several processing requirements that present obstacles to ready use in authentication of descriptive statements. First, hashing is generally performed in a collective manner and provides a different result if the descriptive statements are changed at all, even in their relative order; as a result, authentication schemes typically first rely upon a sorting of descriptive statements retrieved from a data store to a common, predetermined order. Without this sorting, storage or processing order of downstream machines may result in a very difficult attempt to verify a hash based upon re-ordered statements, and there exists a substantial likelihood of a failure to authenticate statements that are in fact legitimate. Sorting, however, often requires a substantial amount of time (proportional to the term nlogn), particularly if the number (n) of statements is large. Second, if it is desired to add a new statement to an existing electronic object (e.g., communicating that "this document was later modified on date X"), the original document must typically first be authenticated, the new statement added, the statements re-sorted, and a completely new hash re-computed; otherwise stated, the conventional processes provide no easy, computationally simple way to add and authenticate new statements. Third, some descriptive statement methodologies employ "blank node" techniques, where every recipient or storing machine can create and apply its own "label" to identify certain electronic nodes; the net effect of these labels can be to change the descriptive statements in a data storage in a way that does not undermine their authenticity, but that does tend to lead to a failure to authenticate (because a "hash" of the label-modified statements generally will not match the original hash represented by the digital signature). These difficulties have only hindered some applications of descriptive statement methodologies, e.g., of the RDF.

A need exists for a computationally efficient system for processing descriptive electronic statements about objects. More particularly, a need exists for a system that can rapidly digitally sign (or authenticate) a set of statements, if possible, without being always required to sort those statements to a predetermined order. Still further, a need exists for a verification system that is insensitive to varying blank node expression techniques (whether employed a data storage system or intermediate node). Finally, a need exists for a system that can rapidly, securely and efficiently compute a new hash, and digitally re-sign, a set of statements that have been legitimately modified. The present invention satisfies these needs and provides further, related advantages.

SUMMARY

The present invention satisfies these needs by providing a method and apparatus for processing descriptive statements. More particularly, the present invention provides a methodology that can reliably and quickly be used for digitally signing and for authenticating descriptive statements. As should be apparent, the present invention therefore potentially extends the capabilities of information technology, by making it easier to use descriptive statements to describe resources (e.g., web-accessible resources), and easier to effectively create and employ applications that rely upon authentication of those descriptive statements.

One form of the present invention provides a method of processing information representing a graph by serializing each of multiple (i.e., at least two) statements, using a digital processor to compute a hash, independently for each of the multiple statements, and applying a commutative function to the individual hashes to obtain an aggregate hash representing all of the statements. Through the use of individual hashes for each statement and a commutative function, the multiple statements in question may be individually processed without regard to order (or prior sorting) of the statements. This operation, in turn, makes it easier to later add descriptive statements relating to an underlying object (e.g., a document or web page) and to digitally sign the later statements without sorting, processing and digitally signing all statements for the object anew.

A second form of the present invention provides a method of processing information representing a graph to add a new statement where the addition method roughly corresponds to the principles indicated above.

Other forms of the present invention provide, respectively, a method, apparatus, improvement, data store and method of doing business that roughly correspond to the principles described above.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 is a diagram that illustrates a graph of multiple exemplary descriptive statements.

FIG. 2 is a diagram that illustrates processing of multiple descriptive statements representing a graph.

FIG. 3 is a diagram that illustrates processing of data representing a graph to add a new descriptive statement.

" FIG. 7 illustrates an embodiment where statements including one or more "blank nodes" are processed such that they can consistently signed and authenticated by other machines or by a recipient of the statements.

FIG. 9 is a diagram used to explain a data store that implements principles of the present invention, and also a business method based upon hosting of a data store and provision of verification services.

FIG. 10 is a diagram used to explain a first service that implements principles of the present invention.

FIG. 11 is a diagram use to explain a second service that implements principles of the present invention.

DETAILED DESCRIPTION

Figure 4:
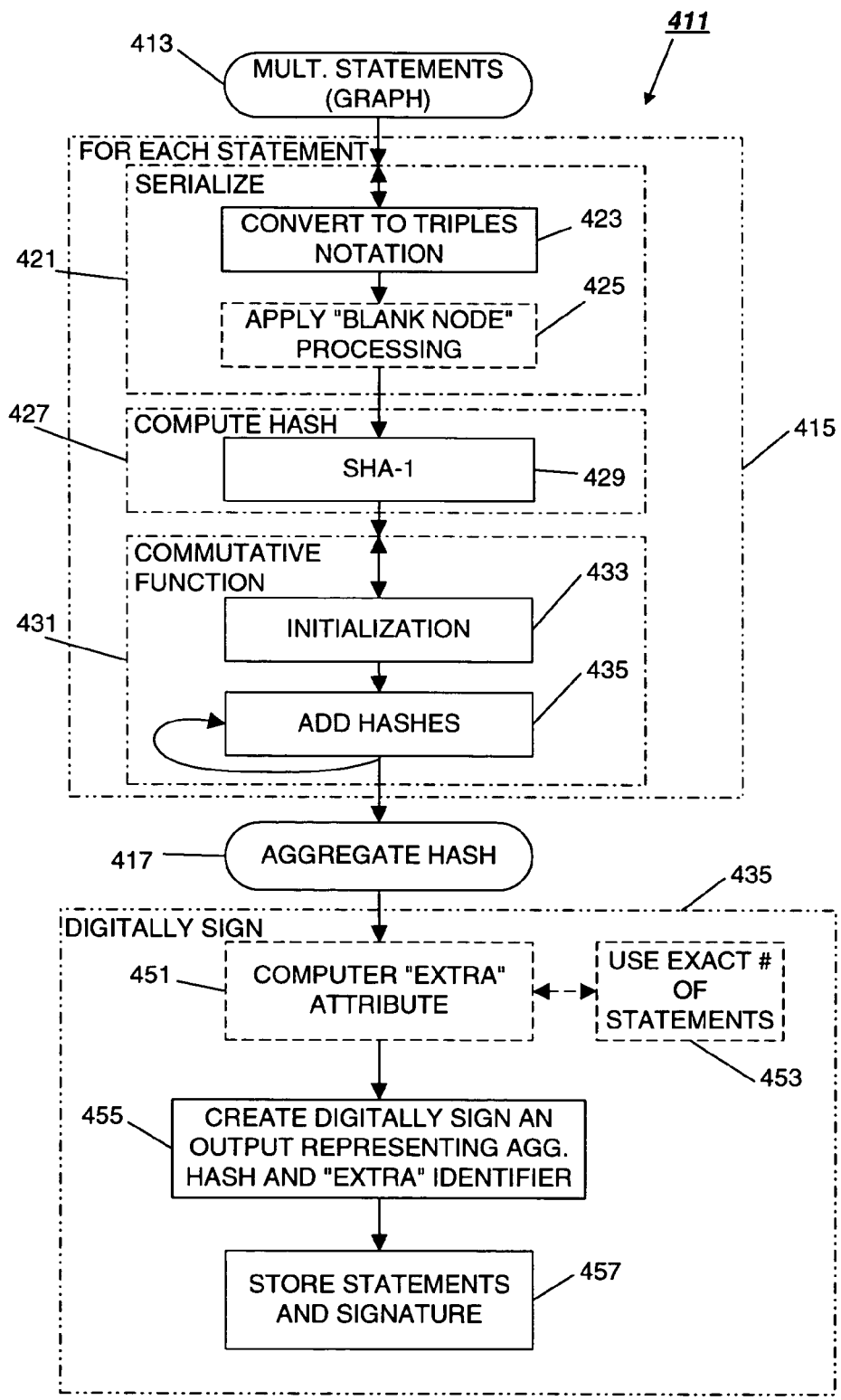
FIG. 4 is a diagram that illustrates digitally signing statements that represent a graph, using principles of the present invention.

The invention summarized above and defined by the enumerated claims may be better understood by referring to the following detailed description, which should be read in conjunction with the accompanying drawings. This detailed description of one or more particular embodiments, set out below to enable one to build and use various implementations of the invention, is not intended to limit the enumerated claims, but to exemplify their application to certain devices.

The description set out below exemplifies application of the invention to the processing of statements associated with a Resource Description Framework ("RDF") graph. The invention, however, may also be applied to other descriptive statement methodologies and systems as well.

I. Introduction to RDF Graphs and Statements.

The present invention relates to processing of descriptive statements relating to graphs. For purposes of the embodiments described below, it should be assumed that the operands are RDF statements that conform to the world-wide web consortium ("W3C") standards for the RDF found at "<www.w3c.org>". The teachings found on that website relating to the RDF are hereby incorporated by reference, specifically including the RDF syntax document found at "<http://www.w3.org/TR/2004/REC-rdf-syntax-grammar-20040210/>", the RDF primer document found at "<http://www.w3.org/TR/2004/REC-rdf-primer-20040210/>", the RDF concepts document found at "<http://www.w3.org/TR/2004/REC-rdf-concepts-20040210/>", the RDF symantics document found at "<http://www.w3.org/TR/2004/REC-rdf-mt-20040210/>", the RDF vocabulary document found at "<http://www.w3.org/TR/2004/REC-rdf-schema-200-40210/>", and the RDF test cases document found at "<http://www.w3.org/TR/2004-/REC-rdf-testcases-20040210/>".

FIG. 1 illustrates a hypothetical RDF "graph" 111. The graph 111 presents various descriptive statements related to a hypothetical employee, "John Smith." This hypothetical employee has associated information that is to be made available by the company in an electronic format, and is identified by a Universal Resource Identifier ("URI") "http://co.com/People/1A1" 113. For the purposes of communicating information such as context, it is desired that this URI 113 should be created in a manner that outwardly identifies certain properties including, respectively, that the employee has full name "John Smith," and also that the employee is managed by another person, an employee identified by a second URI "http://co.com/People/1A2" (115).

While this information and the "statements" made via the information are depicted in FIG. 1 in the form of a graph 111, it should be understood that there are a variety of formats in which the information could be equivalently presented or stored. For example, this information may reside as a collection of individual statements in an information store, or it may be embedded in an XML format within a web page, or it may be returned as the result of a computer query, such as a database query in a variety of different formats (such as in a "triples" format, discussed further below).

In FIG. 1, ellipses 113 and 115 are used (as is conventional) to identify URIs in the graph 111; by contrast, a box 117 is used to identify a node that is a "literal" or constant that itself does not require further reference; in the RDF, any "subject" may be described by reference to a "property" (or "predicate") and to a value (or "object") for that property; properties are indicated (in conventional RDF graphs) via lines or arcs (such as lines and associated references 119, 121 and 123 in FIG. 1) while objects are defined either by URIs (such as presented by an ellipse 115) or by a literal string (such as indicated in box 117).

Each arc between nodes corresponds to a single statement in the RDF Graph. In the particular case of FIG. 1, a first arc 119 has a property of "http://ex.com/manages," which indicates that employee 1A1 (John Smith) has a property of "manages" explained by URI "http://ex.com/manages;" similarly, a second arc 121 indicates that John Smith is the object of another property "managed by" explained by URI "http://ex.com/managedBy," while a third arc 123 indicates that John Smith has a property of "fullName" which has a meaning defined by the URI "http://ex.com/FullName." In the hypothetical presented by FIG. 1, the value or object of "manages" is given by a URI 115 "http://co.com/People/1A2" {i.e., an electronic reference to the identity of a second person who John Smith manages (119) and who is also the subject managed by (121) John Smith}; the value of the property explained at "http://ex.com/fullName" by contrast is a literal data string having the value "John Smith" (117).

The statements of FIG. 1 and graph 111 represented by FIG. 1 may equivalently be written using an N-triples syntax, as indicated below. These statements and the syntax below represent a graph, because they represent a set of statements.

| | | |
|---|---|---|
| http://co.com/People/1A1 | http://ex.com/fullName | "John Smith". |
| http://co.com/People/1A1 | http://ex.com/managedBy | http://co.com/People/1A2. |
| http://co.com/People/1A2 | http://ex.com/manages | http://co.com/People/1A1. |

It should be appreciated that the use of descriptive statements and languages for expressing those statements, irrespective of format, permit any electronic resource, such as an electronic document or web page, to be described in a referential manner by indicating a "property" and by providing a reference (or object) for what is meant by that property. For example, in electronic searching, it may not be important that a computer understand the term "student" as long as the computer can associate this term with other electronically-accessible resources; ideally, the computer can link to a URI that provides a specific context associated with this particular usage of the term "student" and, furthermore, other computers can link to this very same URI to provide a common frame of reference. This structure is represented in part through the example presented in FIG. 1, where it is seen that "properties" are defined by reference to a URI associated with "ex.com," which may be a different set of resources not maintained by the hypothetical employer of John Smith (it can be assumed for purposes of the hypothetical that the employer is associated with the resource "co.com"). Since languages such as the RDF provide a way to create shareable references or "vocabularies" (anyone can create a reference or definition and identify it using a URI), in any language, and for any context, these languages provide a mechanism for enabling applications to sort through information based upon context.

These concepts relating to descriptive statements, and the hypothetical statements and graph represented by FIG. 1, are used in the discussion that follows.

II. Processing of Statements.

As indicated earlier, the present invention provides a way of processing statements in a manner that facilitates authentication and verification of those statements.

FIG. 2 shows one embodiment 211 of the present invention where multiple statements 213 are processed in order to generate an output hash 215. In discussing the processing represented by FIG. 2, it should be assumed that a resource and its set of statements are to be securely represented on a remote data store. The same processes could of course be used if one instead retained direct control over the resource and statements, but it simply would tend to be less likely in this event that one would fear compromise. For much of the discussion below, therefore, it should be assumed that one person has created or wishes to create an electronic resource, and has stored it in a remote data store, e.g., on a server accessible to many users such as the general public. It should also be assumed that at some point, a user (perhaps the same person or a different person) wishes to authenticate veracity of the statements found on the server, i.e., to ensure those statements represent untainted versions of the original statements made by the creator of the resource.

Returning to the example of FIG. 2, the first processing step is to create a canonical serialization for each individual statement representing or associated with a RDF graph. As done in connection with the embodiments discussed herein, one way to accomplish this end is to write each statement using the N-triples syntax and eliminate any optional white space. For example, using the hypothetical of FIG. 1 and the N-triples syntax example presented above, one would convert this previous example as indicated below.

http://co.com/People/1A1 http://ex.com/fullName "John Smith".

http://co.com/People/1A1 http://ex.com/managedBy http://co.com/People/1A2.

http://co.com/People/1A2 http://ex.com/manages http://co.com/People/1A1.

In this example, each descriptive statement may be expressed as a single line with three entries; it would be understood that the three triples' terms in order represent subject, predicate and object of a RDF statement.

With canonical serialization complete for a statement, the statement is then independently processed to compute a hash specific to that statement. While there are many hashing algorithms used for digital signature and similar applications, SHA-1 is often used (and should be understood as used in this example) because it provides a 160 bit output. In the embodiment of FIG. 2, each statement is independently converted by the SHA-1 algorithm into data blocks, with padding zeros as necessary, and used to develop a 160 bit hash value for the corresponding statement.

In this regard, conventional wisdom calls for always sorting to a common, known format, such that later verification of an authentic duplicate produces an identical hash value. By contrast, the embodiment of FIG. 2 calls for independent hashing of each statement in isolation, and use of a commutative function to combine these hashes. This operation should result in substantial computational and time savings, because it does not require the time associated with a sort or common order, in any of signature, verification, and statement modification processes. Whereas conventional processes generally require processing proportional to the value nlogn, where n represents the number of statements, processing according to the embodiment presently being discussed should be proportional to the substantially smaller value of n.

As indicated by block 221 of FIG. 2, each of the independent hashes is combined together using a commutative function. By "commutative function," it is meant that the process for combining statements into a hash is independent of the order in which the statements are processed; in mathematical terms, this requirement can be represented by the notation fn(A,B)=fn(B,A), that is, that the result is the same whether A and B are changed in their relative order. Hashing each statement independently and applying a commutative function to combine results permits the embodiments discussed herein to operate in a manner independent of the ordering of the descriptive statements, i.e., a common sorting operation is not required. By contrast, conventional processing usually is predicated upon a collective hash, and the order of processing the statements generally changes the value produced by the hashing operation. See, e.g., "Signing RDF Graphs" by Jeremy J. Carroll, HP External Technical Report, HPL-2003-142, published in July 2003.

Notably also, the commutative function used may also be associative, such that it also permits later, incremental addition of new statements without having to newly process the entire collective of statements (including any new statements to be added) in order to properly sort the newly added statements. By "associative," it is meant that the process for combining statements into a hash may also operate upon different combinations of elements without altering the results, e.g., (A+B)+C=A+(B+C); for example, a first hash may be computed upon statements A and B, and a hash of statement C may later be added to produce a cumulative hash, and this cumulative hash would be the same as if A, B and C were all originally hashed together, at the same time.

One of the simplest cases for a function that is both commutative and associative, and the function used for the purposes of the examples presented here, is the function of addition. One reason for using the SHA-1 algorithm for hashing, as mentioned earlier, is that this algorithm produces a 160-bit output (and therefore an additive procedure results in addition within a finite field with an associated modulus). If the number of statements is small, an additive function may be in general effectively implemented with arbitrarily large number arithmetic, such as "BigInteger" in the JAVA language. This cryptographic operation may be either a simultaneous or incremental operation depending upon implementation, i.e., whether multiple statements are processed together, or whether each statement is hashed and added to an accumulating total.

Other associative and commutative functions will also occur to those skilled in computer science, and may be equivalently used. For example, the function of multiplication is also both associative and commutative, and may be also be used in an incremental hashing operation.

Once all statements are combined into an aggregate hash value, an output hash value 215 is created, and may readily be applied for purposes of signature and verification processes. As indicated above, additional descriptive statements may also later be generated and the aggregate signed through use of an incremental hash operation—that is, the existing aggregate hash value may simply be reused in signing a modified electronic resource, without much of the conventional complexity and difficulty associated with sort-based hashing of descriptive statements and graphs. It should be clear that this functionality permits ready adaptation of the invention to applications where signature and verification of statements are important, i.e., the use of an incremental hashing process permits ready modification and signing of electronic resources, and provides some significant capabilities relative to conventional signature processes.

Importantly, while the description provided above focused on use of a particular serialization methodology, hashing algorithm (SHA-1) and commutative function (addition), it should readily be appreciated that other operations may be used for serialization, hashing and as the commutative function.

III. Modification of an Existing (Signed) Graph.

FIG. 3 is used to illustrate how the principles just mentioned for processing statements may be used to incrementally add a new statement to an existing graph. A first example of when it might be desired to add a statement would include revision of an electronically-posted document; one can envision the posting of a document where statements about the document are made including the creator name, the source of the document (e.g., a standards body), the copyright holder in the document, the revision date and the name of person making revisions. In a hypothetical situation, it might be desired to add a statement that adds the latest revision date, e.g., <this document> <revised> <Dec. 15, 2001>. Adding a statement of this type is not only computationally straightforward using the present invention, but is also far simpler than would be the case for conventional processes. A second example of when a new statement might be incrementally added to an existing graph would be in connection with blank node processing (discussed further below). Still further, a third example might be when an existing statement is to be subtracted from a set and the remaining statements resigned for independent authentication of the remaining statements of the set (subtraction instead of addition would then be used to calculate the cumulative hash value as a number less the hash of the removed statement).

In the embodiment 311 of FIG. 3, it should be assumed that there is an existing electronically-accessible resource that has associated with it a set of multiple statements and an associated hash 313; the hash represents the entire set of statements represented by block 313. It is desired to add a new statement 315, and accordingly, the existing set of statements is first verified to ensure that it has not been tampered with or has otherwise been tainted. [This process is optional as indicated by dashed line reference in FIG. 3, i.e., it may be that the original statements were never signed or that verification of the original statements is not considered important in the particular application.] One suitable verification process will be explained below, in connection with FIG. 5, but for purposes of the embodiment in FIG. 3, it should be assumed that a conventional verification process is employed.

If verification is established, the new statement is processed by computing a hash independently for it, and by adding this new hash to the existing hash using a commutative function, in the manner described above in connection with FIG. 2. This new hash is then output, for possible use in digital signature or verification functions. These processes are respectively indicated by reference numerals 319, 321, 323 and 317 of FIG. 3, respectively.

It should be mentioned for purposes of the embodiment of FIG. 3 that it is not necessarily essential that the hash for the (preexisting) multiple statements be a commutative hash as described earlier; for an embodiment of the invention that adds a new statement without requiring a complete re-sort of existing statements, what matters is that the collection of statements (when later downloaded) can be processed in a manner that reproducibly provides the same hash value as a "verification hash" kept together with those statements. If the preexisting statements have not been processed in accordance with the present invention, those statements may still require a sort according to conventional methods, but that sort will produce the same hash results as long as (a) the hash methodology for the original statements is known (including any sort format), (b) the newly added statement is recognized as such and is extracted from the set of original statements by a receiving machine. The set of all statements for a resource preferably are processed using principles of the present invention, but as indicated by FIG. 3, the present invention can be applied on an incremental basis to preexisting resources and descriptive statements, potentially including those that have been signed by conventional processes.

IV. Signing and Verifying Statement Sets

With the principle parts of the invention described above, application of the present invention to digital signing and to verification will now be described in additional detail. In particular, FIG. 4 presents a flow chart used to explain a digital signature process 411 that implements principles of the present invention, while FIG. 5 presents a flow chart used to explain a verification process 511 that implements principles of the present invention.

Figure 5:
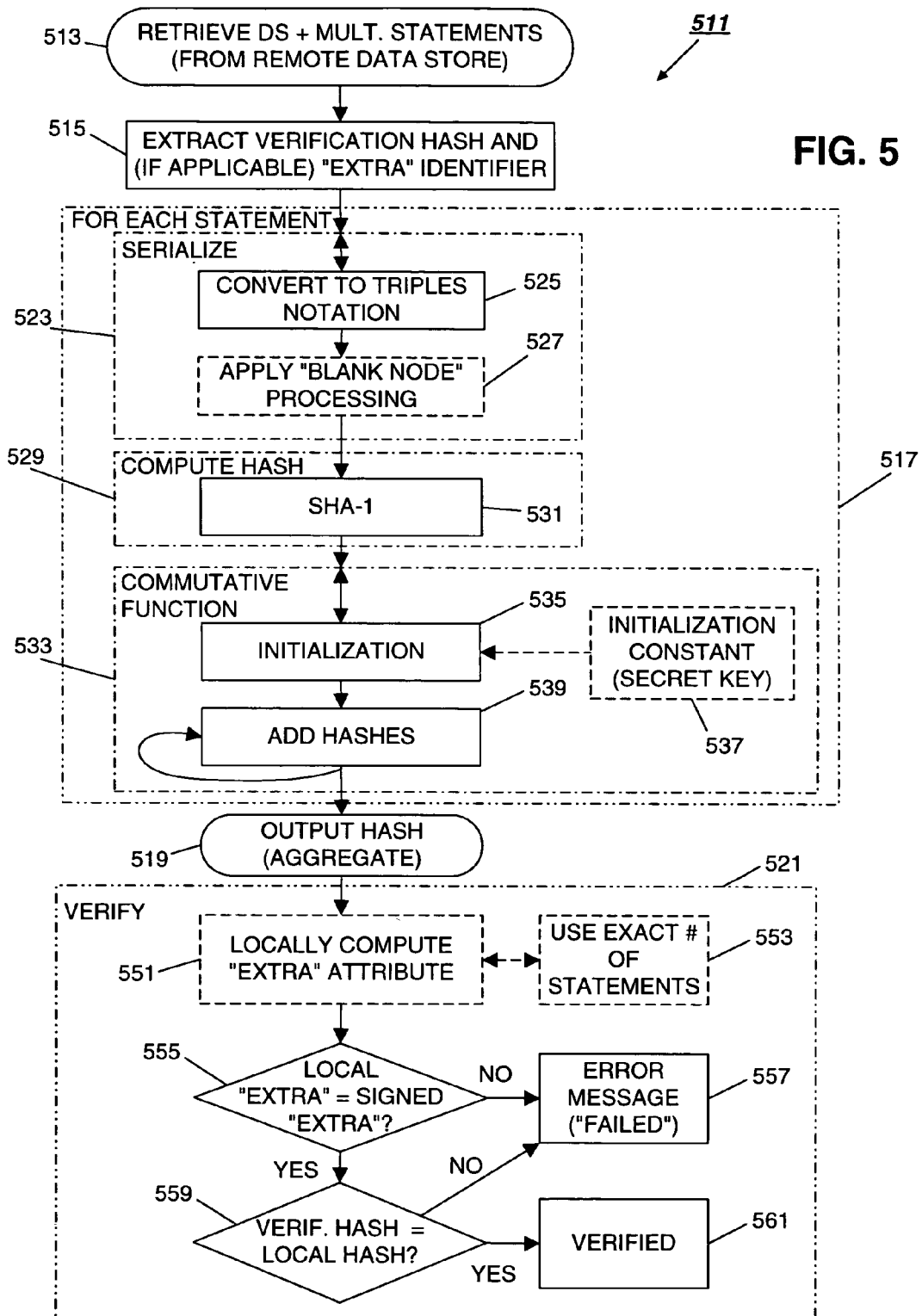
FIG. 5 is a diagram illustrating authentication of statements made in a graph, using principles of the present invention.

FIG. 4 presents an example where it is desired to process multiple descriptive statements and to create a digital signature that may later used to verify the authenticity of those statements, to ensure that they have not been compromised. As indicated by FIG. 4, the digital signature process 411 accepts a set of multiple statements 413 representing a graph, it then applies a process 415 to those statements to create an aggregate hash 417, and it then utilizes a signing process 419 to create a final signature.

The multiple statements 413 are first processed in a manner that has been already described for purposes of generating an aggregate hash. First, the statements are serialized in preparation for the hashing operation. The serialization process, indicated by numeral 421 in FIG. 4, can use a common, relatively condensed format such as triples notation, as referenced by numeral 423.

Importantly, FIG. 4 shows a dotted line block 425 to indicate optional "blank node processing" which may be implemented to correctly process any blank node labels that may have been assigned by network nodes "upstream" to a receiving machine. As indicated earlier, blank node processing will be further discussed below.

Serialized statements are then "hashed," in this embodiment by applying a SHA-1 scheme, as indicated by reference numerals 427 and 429 of FIG. 4; a commutative function 431 is then applied to the statements to generate the aggregate hash 417. In the embodiment of FIG. 4, the function may be assumed to be an incremental function that is both commutative and associative, that is, one that operates on one operand at a time, on an incremental basis. The function first begins with an initialization process 433; in one embodiment, the function can start with a constant such as "zero" or, in another contemplated embodiment, the constant could be a binary value provided by a secret key (that will be used or exchanged in secret for purposes of permitting only select users to verify authenticity). As each statement is processed and a hash computed, this hash is then incrementally processed using the function to combine it with the aggregate hash value. For example, in processing a first statement and using an initialization constant, the commutative and associative function of addition would output the sum of the hash for the first statement and the constant. This existing output would then be added to the hash for a second statement to develop a new value, and so on. When all statements have been processed in this manner, the result will be the aggregate hash 417, which can then be signed using the process of block 419.

The signing process 419 can be any conventional signature process, and is typically applied to at least the aggregate hash 417. Optionally, however, other measures can also be employed to enhance the security of the resulting digital signature, and such measures are indeed preferably used in connection with the embodiment of FIG. 4.

It may be desired in some implementations to use an "extra" attribute and to sign by convention not just the aggregate hash representing statements, but to sign the "extra" attribute as well. The "extra" attribute is ideally chosen to represent the aggregate of all statements that figure into the hash, so as to make the task for an attacker more complicated. In particular, one simple attribute that serves this purpose is the precise number of statements represented by the aggregate hash—an attacker attempting to forge a graph would in this case need to find a set of statements which both produces the same aggregate hash and also has the same number of statements as the authentic graph.

These "extra" attribute operations are indicated in FIG. 4 by the reference numerals 451, 453 and 455, and typically, would feature the aggregate hash output (e.g., the 160 bit output of a SHA-1 process) simply followed by a number of bits identifying the number of statements. There are also various other equivalent "extra" attributes that will occur to those with skill in computer science, i.e., that can be used to make a successful brute force attack computationally much more complicated.

With the digital signature created, the set of descriptive statements and the digital signature may be stored in a remote location for purposes of later public or private access, as indicated by reference block 457. The statements themselves are downloaded or accessed by a remote user, and the digital signature may be selectively used to reliably verify that the remotely stored versions of the descriptive statements have not been altered or tampered with. Applying the example raised earlier, if an electronic statement about the "owner" of a piece of real property was tampered with to misdirect people accessing electronic resources about the real property, an attempt to verify the aggregate hash would result in an error message, because it would be computationally extremely difficult to produce an identical hash based upon the forged statement; the use of an appropriate "extra" identifier can render this task even more difficult.

FIG. 5 illustrates a verification process 511 that implements principles of the present invention; such a process can be used when it is desired to verify the authenticity of descriptive statements, for example, statements that were also processed originally using the methodology explained with reference to FIG. 4 and stored on a remote data store such as kept by a remote server (not shown).

In order to access and authenticate these statements, the process 511 retrieves those statements from a remote data store, as indicated by block 513. The first processing step 515 is to extract a "verification hash" from the digital signature; the verification hash is simply the encrypted hash of the original statements (e.g., as created by the original creator of the statements and that was the aggregate hash represented by block 417 in FIG. 4). Because it is not known whether the statements stored on the remote data store (e.g., the server) are original and authentic, a new hash is then by process 517 computed based on the retrieved statements. In a later process 521, the verification hash will be used for comparison with the new hash, in order to analyze whether the retrieved statements are authentic copies of those used originally to calculate the verification hash. Since a digital signature conventionally will be created using an asymmetric key pair (e.g., a private key and corresponding public key), a first "un-signing" process (515) is carried out in order to extract the verification hash (as well as the "extra" identifier if one has been used), and the public key (or other decryption tool, e.g., use of a shared secret key) may be used for this purpose.

With the verification hash extracted for use as a reference, the retrieving system then computes an aggregate hash using a process 517 similar to that described in connection with the signing process of FIG. 4. For example, the system first serializes the copies of statements retrieved from the remote server, ideally through conversion to triples notation and blank node processing, if applicable, all as represented by data processing blocks 523, 525 and 527. With the statements serialized, the receiving system then computes independent hashes (e.g., using a SHA-1 scheme) and it aggregates those hashes using a commutative function, all as indicated by processing blocks 529, 531 and 533. If an incremental approach was used was used in the original initialization process (e.g., processing block 433 of FIG. 4), and an initialization constant was used, the system applies an identical initialization process 535 and constant (e.g., a secret key such as indicated by processing block 537) and combines these together using a commutative and associative function; as depicted by block 539 of FIG. 5, in this embodiment, addition may be used as the function, to generate the output hash 519.

It should be appreciated that by applying principles of the present invention to a verification process, one may compute a local hash for use in verification without any pervasive requirement to sort all statements to a common order. The potential computation savings presented by the present invention should therefore greatly enhance the usability of descriptive statements and languages such as provided by the RDF, by rendering it relatively easy to perform verification.

A match between the output hash and the verification hash from the remote server implies that the copies of descriptive statements downloaded from that server have not been altered relative to those used to create the original verification hash and signature. The verification process 521 of FIG. 5 accordingly processes the retrieved statements to obtain an "extra" identifier (if such was part of the digital signature) and if appropriate, uses the number of retrieved descriptive statements, as indicated by processing blocks 551 and 553. If the locally-computed "extra" identifier matches the identifier retrieved from the remote server, as indicated by processing block 555, then the system proceeds to compare the two hashes (as indicated by block 559). A mismatch between either the identifiers or the hashes will generate an error message 557 while, as indicated by reference numeral 561 a match of the identifiers and the hashes will lead to a confirmation of the retrieved statements as authentic.

VI. Blank Node Processing.

As mentioned previously, one problem associated with conventional verification schemes for descriptive statements relates to the use of "blank nodes" or "bnodes" in some processing methodologies. The RDF supports blank node usage, and this usage can create problems for conventional verification of descriptive statements. [It should be mentioned that the term "nodes" when used in the context of the RDF refers to a blank subject or object, i.e., to a thing connected to an "arc;" this usage should not be confused with the use of the term "nodes" in terms of computer networking, i.e., where a network node can be any device connected at the end of a transmission path, for example an originating or receiving computer, a server, as well as any of variety of devices that couple and route communications between these points.]

Figure 6:
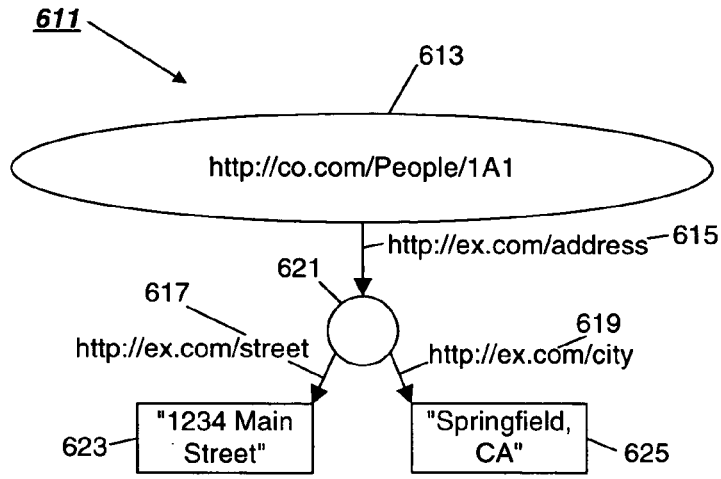
FIG. 6 shows an example of a graph of descriptive statements that represent a "blank node."

FIG. 6 presents another hypothetical graph 611 which presents address information for the hypothetical employee of FIG. 1. FIG. 6 indicates that a first URI 613 has a property 615 of "address" explained at "http://ex.com/address." Since this hypothetical address is composed of several parts, it is convenient to introduce a new node to represent the address—the node has no label, and is termed a "blank node" or "bnode." The blank node in effect indicates that this property (address) is in fact composed of two components 615 and 617, including "street" (explained by "http://ex.com/street") and "city" (explained by "http://ex.com/city"). The blank node is graphically indicated by the reference numeral 621 in FIG. 6, and by a circle having no label.

In terms of N-triples syntax, the statements associated with blank node 721 could be indicated as follows.

| http://co.com/People1A1 | http://ex.com/address | _1. |
|---|---|---|
| _1 | http://ex.com/street | "1234 Main Street". |
| _1 | http://ex.com/city | "Sprinfield, CA". |

This notation (in particular, use of the notation "_1") represents the fact that any name for the node is arbitrary; in practical effect, the terminology indicates that any machine or data store upon which these statements may assign a naming convention of its choosing. For example, a remote server receiving these hypothetical statements could rename this blank node using the designation "_3" (which it might do as a practical matter to avoid confusion with other blank nodes the resource may hypothetically possess). The hypothetical descriptive statements indicated above might then be represented in a remote data store as indicated below.

| http://co.com/People1A1 | http://ex.com/address | _3. |
|---|---|---|
| _3 | http://ex.com/street | "1234 Main Street". |
| _3 | http://ex.com/city | "Sprinfield, CA". |

Unfortunately, a verification process based on these "altered" statements might falsely return an error (even though the statements possess appropriate information), because a hash computed by a receiving machine would be different because it references the bnode label applied by the data store (e.g., term "_3"), instead of the original label that was the subject of the digital signature (e.g., "_1").

The embodiments discussed above therefore preferably perform blank node processing in one of three ways, depending upon particular implementation. One method may be applied in instances where a signing process is being used for a newly described resource; in this case, software simply "forces" assignment of a name to the blank node; otherwise stated, the node (such as node 125 from FIG. 1) is processed so that no blank node ever exists, i.e., a blank node is replaced by a name. A second method may be applied if the signing end and verification end have access to common resources; in this case, software for the signing end may simply replace the bnode with a URI that identifies the resource; this URI, if not publicly accessible, provides a mechanism roughly equivalent to the embodiment where a secret key is exchanged for use in an initialization process (as discussed above in connection with FIG. 4). Finally, if the signing process is performed remotely from where the descriptive statements are to be stored, for verification by possibly unknown recipients, a third blank node process is employed by the machine that stores the statements; in this case, a new, additional descriptive statement is generated to identify the locally assigned-naming convention, and this statement is both written into the data store as part of the set of descriptive statements, and it is also added into the signature using an incremental hash and signing process (just as described above, in connection with FIG. 3). An example including such a statement is given immediately below.

| _1 | http://ex.com/street | "1234 Main Street" |
|---|---|---|
| _1 | http://ex.com/city | "Springfield, CA" |
| _1 | http://site.com/HasLabel | "_1" |

As these statements are processed, a machine mid-stream may re-label the blank node and thereby change the statements; for example, re-labeling the blank node "_1" from as "_3" might result in new statements given just below.

| _3 | http://ex.com/street | "1234 Main Street" |
| _3 | http://ex.com/city | "Springfield, CA" |
| _3 | http://site.com/HasLabel | "_1" |

In this case, the software that stores the descriptive statements effectively creates a URI that indicates that stored statements possessing the label "_3" should be reverse-processed to replace this label with a blank node subject ("_1") prior to any verification step. With this information, a receiving machine will in effect "un-do" (as part of the verification step) any legitimate blank node processing step that may have been performed by a machine hosting an intermediate data store to recreate the original bnode labels. The receiving machine performs this step by looking for a statement with the predicate "http://site.com/HasLabel" and using the object of that statement to rename an associated bnode; the receiving machine's processing software will then perform verification by operating upon modified statements (where in effect, the modifications un-do any earlier modifications made to label blank nodes).

Figure 7:
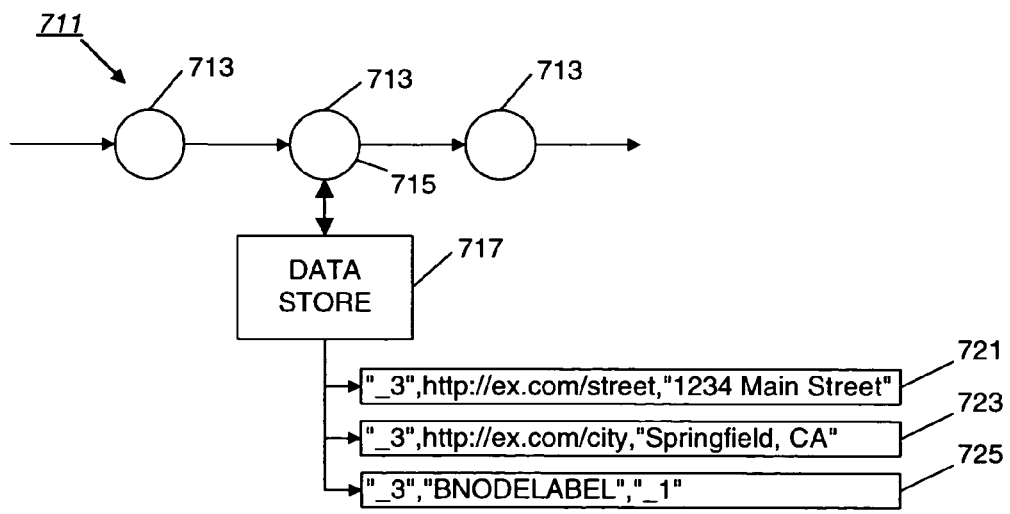
FIG. 7 illustrates a network node that remotely stores statements including "blank nodes.

FIG. 7 illustrates a hypothetical network 711 that implements blank node processing using a "reverse-processing" statement, as just described. More particularly, FIG. 7 shows a number of network nodes 713, one of which (715) maintains a data store 717 that applies a blank node naming convention. As was introduced by FIG. 6, the data store contains individual statements such as corresponding to street address 721 and city and state 723, these two statements being associated with the blank node of FIG. 6. Implementing the blank node processing features of the present invention (and, as was alluded to above in connection with processing blocks 425 and 527 of FIGS. 4 and 5, respectively), this data store 717 adds a new statement 725 identifying a local "bnode" label, and providing a URI as a predicate that identifies how that label is to be reverse-processed to later undo the label assignment.

Figure 8:
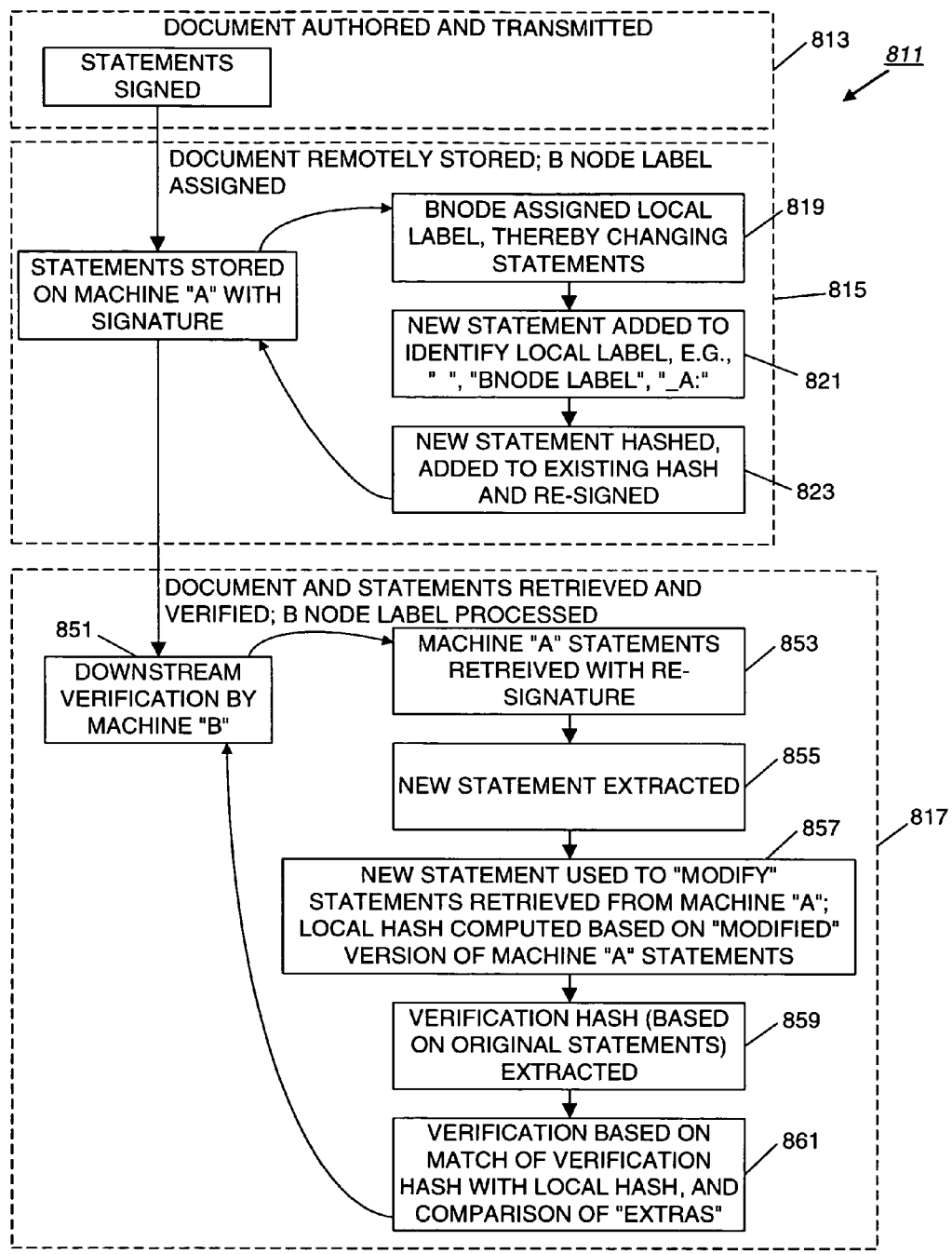
FIG. 8 is an illustration used to explain "blank node" processing, such as may be optionally used in the embodiments seen in FIGS. 2-5 and FIG. 9.

The cycle of creating and signing a graph, storing those statements in a way that accommodates blank node re-labeling, and downstream authentication is further illustrated by FIG. 8; FIG. 8 illustrates a system 811 having three distinct nodes or machines, including a first network node 813 where statements representing a document are originally authored and transmitted, a second network node 815 where a machine (machine "A") stores the document and associated statements (and assigns a blank node label), and a third network node 817 where a downstream machine (machine "B") is called upon to retrieve and verify the documents and statements. In the example presented by FIG. 8, it should be assumed that a document is to be publicly posted, such that any number of recipients may desire to process that document and to authenticate its statements. As indicated in connection with the second network node 815, at the time a blank node label is assigned, a digital signature based upon the original statements potentially is invalidated, as indicated by reference block 819. To address this issue, system software generates a new statement that is to be added to existing statements for the resource (document) at-issue; as indicated above, the new statement identifies appropriate reverse labeling, and software then adds this new statement to the existing aggregate hash and resigns the result, as indicated by processing blocks 821 and 823.

When verification is later requested by a downstream machine, e.g., machine "B," as indicated by reference numeral 851 in FIG. 8, the statements are retrieved from machine "A" together with a digital signature. The newly added statement is recognized, verified and used to process other statements retrieved by machine B, as indicated by processing blocks 855 and 857 of FIG. 8. With the "bnode label altered" statements from machine A therefore modified to reconstruct the original statements, the verification hash is extracted and a local hash of the reconstructed statements computed for verification purposes; if any "extra" attribute was used as part of the original signing process, a like metric is locally computed based on the retrieved statements, and verification established as was described above and depicted by reference blocks 859 and 861.

It should be apparent that by performing blank node processing as described, embodiments of the present invention permit signing and verification to be easily performed by creation of a new statement at the time of blank node labeling; this operation permits one to avoid conventional difficulties associated with blank node processing. Since the present invention facilitates incremental statement addition and signature without requiring a complicated common sorting process, as has been previously described, it permits this ready implementation of the described blank node processing (which conventionally would be computationally expensive or infeasible). By facilitating the handling of blank nodes in this manner, the present invention further contributes to the usability of descriptive statements in information technology, and further enhances effective filtering and processing of electronically-accessible resources. As will be described further below, the techniques described can be implemented commercially as software or hardware (such as a data store that "hosts" electronic resources and documents for retrieval), or as part of a method of doing business.

VII. Implementation; Verification Service Business Method

FIG. 9 is a diagram used to explain a data store 913 that implements principles of the present invention, and also a business method based upon hosting of a data store or provision of verification services.

More particularly, as part of an overall process 911, an originating computer 915 uses a signature process 917 to digitally sign descriptive statements; if desired, a secret key can be used as an initialization constant to limit verification to downstream users who possess the secret key, as indicated by reference numeral 919. These operations are effected by software that preferably embodies the present invention, such as may be supplied upon machine readable media, such as a compact disk 921 illustrated in FIG. 9. The descriptive statements, any associated electronic resource, any "extra" identifiers, and the associated digital signature, are then remotely stored as part of the data store 913. The data store 913 of FIG. 9 is actually depicted to store many such resources, associated statements, "extra" identifiers and associated signatures, as indicated by reference numeral 923. Each resource, and associated materials, is identified by a unique URI 925, 927 and 929, respectively.

Conventionally, the data store 913 may be a server or associated mass-storage device that stores electronic resources (e.g., web sites or documents electronically posted on the web) for download and verification by others. If desired, the data store 913 may be operated as part of a commercial business that posts third party resources and documents for general verification. For example, a business may provide a verification service as part of a commercial service, where information, expressed as statements, is warehoused for wide-spread access; alternatively, a business could provide verification only of documents or statements presented to them, or authenticate specific classes of information, e.g., creator, version date, owner identity or copyright holder. Such a service could be provided as a for-fee service, or alternatively, based upon indirect compensation.

Irrespective of the form in which the statements are stored or hosted, if it is desired to retrieve statements from a data store and locally verify those statements, a downstream computer 951 utilizes software 953 to perform verification, as has been previously described and as is identified by reference numeral 955. If a secret key was used as an optional initialization constant 919, that same constant is used as an input to the verification process in order to provide verification of descriptive statements, such as associated with URI 929.

FIGS. 10 and 11 respectively illustrate two models of a verification service that implement the methodology described above. More particular, each of these figures illustrates a service that does not require maintenance of a data store. In FIG. 10, a service 1011 accepts an input of a RDF graph (i.e., a set of statements) and an "extra" identifier; the service 1011 applies the principles of the present invention to generate a digital signature which may then be used for later verification; if desired, the verification service may host the signature in a publicly accessible manner, such that recipients of the RDF graph can access the Service to obtain the digital signature (and thereby authenticate graphs presented to them). Alternatively, as indicated in FIG. 11, a verification service 1111 may accept inputs of a RDF graph (i.e., a set of statements) and a digital signature, for the purposes of providing an output that the graph is "verified" or that verification "failed." In the model presented by FIG. 11, a downstream recipient would be the requestor of the verification service, and would either receive confirmation that the RDF graph is authentic, or would be informed that the verification failed.

By providing a data store and method of doing business through the provision of verification services to others, the present invention helps foster applications, particularly for the world-wide web, where data may be effectively indexed and signed, authenticated and relied upon.

VIII. Conclusion

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

The invention claimed is:

1. A method of processing information representing a graph, comprising:
   serializing each of multiple statements;
   using a digital processor to independently compute a hash value for each of the multiple statements; and
   applying a commutative function to each hash value, to obtain an aggregate hash value representing all of the multiple statements.

2. A method according to claim 1, further comprising:
   identifying at least one attribute of the multiple statements; and
   using the digital processor to digitally sign a value dependent upon both of the aggregate hash value and the attribute.

3. A method according to claim 2, wherein said method further comprises:
   identifying as an attribute the number of statements that have been hashed and that are represented by the aggregate hash value; and
   digitally signing a value dependent upon both of the aggregate hash value and the number of statements represented by the aggregate hash value.

4. A method according to claim 1, further comprising adding a new statement to the multiple statements by:
   identifying a blank node;
   assigning a label to the identified blank node; and
   creating the additional statement in a manner that sets forth association of the blank node with the label.

5. A method according to claim 4, wherein:
   said method further comprises using the digital processor to compute a hash value for the additional statement to thereby create an incremental hash value, and combining the incremental hash value with the aggregate hash value using a function which is both commutative and associative; and
   computing a hash value includes applying a SHA-1 hash algorithm to obtain the hash value of each statement.

6. A method according to claim 1, further comprising:
   identifying a secret key; and
   using the digital processor to digitally sign a value dependent upon both of an aggregate hash value and the secret key.

7. A method according to claim 1, further comprising:
   identifying a public key; and
   using the digital processor to authenticate the graph, including using the public key to decrypt a verification hash, comparing the aggregate hash value to the verification hash, and determining that the graph is authentic in dependence on the comparison.

8. A method according to claim 1, wherein the function is based upon addition within a finite field.

9. A method according to claim 1, wherein:
   applying the function to each hash value includes initiating the aggregate hash value as a constant, incrementally applying the function to each hashed statement to create therefrom a new aggregate hash value, and repeating application of the function until all hashed statements and the constant are represented by the aggregate hash value; and
   wherein the function is both associative and commutative.

10. A method according to claim 9, wherein the constant is zero.

11. A method according to claim 9, wherein the constant is a secret key, and repeating the application of the function yields an aggregate hash value that is dependent upon both of the secret key and all hashed statements.

12. A method of processing data representing a graph, the graph being stored on machine-readable media, said method comprising:
   determining a first hash value representing the graph; using a digital processor to compute a second hash value that represents an additional statement; and
   computing an aggregate hash value that is a function of each of the first hash value and the second hash value, where the function is commutative.

13. A method according to claim 12, wherein:
   determining a first hash value includes retrieving data representing the graph from machine-readable media and also retrieving a verification hash value from machine-readable media, verifying authenticity of the data representing the graph by locally computing a hash value based upon retrieved data representing the graph, and determining whether the verification hash value matches the locally-computed first hash value, and if the authenticity of the data is verified, using the matched results as the first hash value and otherwise generating an error; and adding a new statement to the data by storing the new statement on the machine-readable media, by computing as the second hash value an incremental hash value representing the new statement, and by storing the aggregate hash value on the machine-readable media in association with the graph, where the aggregate hash value represents addition of the first hash value and the second hash value.

14. A method according to claim 12, further comprising:
retrieving the first hash value from remote machine-readable media;
adding the statement by causing the remote machine-readable media to store the additional statement in association with the graph;
computing as the second hash value an incremental hash value representing the additional statement; and
digitally signing the aggregate hash value and causing the remote machine-readable media to store the digitally signed aggregate hash value in association with the data representing the graph.

15. A method according to claim 12, further comprising:
determining an attribute of all data representing the graph, including the additional statement;
generating an aggregate value dependent upon both the aggregate hash and the attribute; and
digitally signing the aggregate value to thereby generate a digital signature.

16. An apparatus, comprising instructions stored on machine readable media, the instructions when executed causing a digital processor to:
compute a hash of each one of multiple statements representing a graph;
apply a commutative function to each of the multiple hashes to thereby yield an aggregate hash representing all of the multiple hashes; and
digitally sign the aggregate hash.

17. An apparatus according to claim 16, wherein the instructions further cause the digital processor to:
compute at least one identifier selected to represent all of the statements represented by the aggregate hash; and
digitally sign the aggregate hash and the at least one identifier.

18. An apparatus according to claim 16, wherein the apparatus permits one to amend resource description framework (RDF) data stored in a web-accessible data store, and to digitally sign that data, said instructions further causing the digital processor to:
accept a new statement from a user;
compute a hash of the new statement;
combine the hash of the new statement with a hash representing an existing RDF graph using the function, where the function is both commutative and associative, to thereby obtain the aggregate hash;
determine an aggregate number of statements representing the RDF graph together with the new statement; and
digitally sign both the aggregate hash and the number.

19. An apparatus according to claim 16, wherein the apparatus permits one to authenticate RDF data, said instructions further causing the digital processor to:
retrieve a set of statements from a remote data store;
retrieve data representing a verification hash from the remote data store; and authenticating the statements by individually computing a hash of each statement, combining together the hash for each statement to obtain an aggregate hash, comparing the aggregate hash with the verification hash, and determining authenticity based on the comparison.

20. An apparatus according to claim 19, wherein the instructions further cause the digital processor to authenticate the RDF data by further:
retrieving from the remote data store a digitally-signed identifier, computing a locally-derived identifier based on the aggregate set of statements retrieved from the remote data store, and determining whether the digitally-signed identifier and the locally-derived identifier match; and
determining authenticity based on comparison of both the verification hash with the aggregate hash, and the digitally-signed identifier with and locally-derived identifier.

21. A method for digitally processing descriptive statements about electronic documents for purposes of verifying authenticity of said statements, the method comprising:
computing a hash independently for each descriptive statement, to obtain multiple statement-hashes;
applying a function to the multiple statement-hashes to generate an aggregate hash, wherein the aggregate hash is characterized that its value is order-independent relative to the order in which the multiple statement-hashes are processed; and
digitally-signing the aggregate hash.

22. The method according to claim 21, wherein:
application of the function is performed by adding the multiple statement-hashes together;
the method further comprises identifying the number of statements that are to be signed; and
digitally-signing includes digitally-signing both the aggregate hash and the number of statements represented by the aggregate-hash.

23. The method according to claim 21, further comprising:
processing blank nodes by adding a new statement to the descriptive statements, where the new statement represents a locally-assigned label associating with local blank node processing; and
digitally-signing an aggregate hash that represents all of the descriptive statements including the new statement.

24. The method according to claim 21, wherein said method is used to authenticate descriptive statements retrieved from a remote data store, by:
retrieving a verification hash from the remote data store;
computing the aggregate hash based upon the descriptive statements retrieved from the remote data store, without first sorting the statements to reorder them;
comparing the aggregate hash with the verification hash; and
determining authenticity of the descriptive statements retrieved from the remote data store in dependence upon the comparison.

25. The method according to claim 24, further comprising:
retrieving from the remote data store a digitally-signed identifier representing the number of descriptive statements representing an electronic document;
locally-computing an identifier of the number of descriptive statements retrieved from the remote data store; and
comparing the digitally-signed identifier with the identifier that was locally computed; and
determining authenticity of the descriptive statements retrieved from the remote data store in dependence upon both of the comparison of the aggregate hash with the verification hash, and the digitally-signed identifier with the identifier that was locally computed.

26. A method of doing business by providing verification services for descriptive statements about electronic resources, said method comprising:

hosting a digital signature, said digital signature based upon an aggregate hash value created by applying a commutative function to multiple independent hash values, each independent hash value based upon a subset of the descriptive statements, and at least one attribute representing the set of all descriptive statements represented by the aggregate hash value; and providing the digital signature in response to remote request that calls for verification of descriptive statements in the hash.

27. A method according to claim 26, wherein:

the number of statements in each subset is one; and the at least one attribute includes the number of descriptive statements represented by the aggregate hash value.

28. A method according to claim 26, further comprising forced labeling of blank nodes, where each blank node is labeled and a descriptive statement identifying each label is included in the set of descriptive statements.

29. A method according to claim 26, further comprising:

hosting the descriptive statements represented by the hash;

hosting among the descriptive statements an identification statement that identifies at least one attribute selected from the set of creator identity, version number, copyright holder, version date, source identity, original creator identity, revision creator identity and owner identity; and verifying the identification statement upon request.

30. A method of doing business by providing verification services for descriptive statements about electronic resources, said method comprising:

receiving a digital signature and a set of descriptive statements;

validating whether the digital signature conforms to a set of descriptive statements, including creating an aggregate hash value by applying a commutative function to multiple independent hash values, each independent hash value based upon a subset of the descriptive statements, decrypting the digital signature and comparing information represented by the signature with the aggregate hash value, to detect whether there is a match condition; and providing a verification response upon detection of the match condition, and providing a failure response if a match condition is not detected.

31. A method according to claim 30, wherein: said method further comprises calculating at least one attribute representing the set of all descriptive statements represented by the aggregate hash value; and decrypting the digital signature and comparing information includes comparing information represented by the signature with the at least one attribute, to detect whether there is a match condition.

* * * * *